Figure 1:
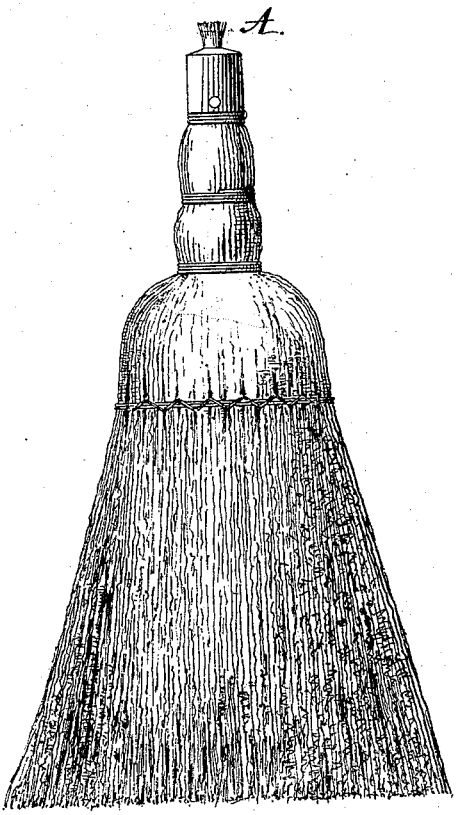

G. Stackpole,
Whisk Broom.
No. 113,358.   Patented Apr. 4, 1871.

Witnesses:
Alonzo Hughes
D. P. Howl

Inventor:
Greenleaf Stackpole

United States Patent Office.

GREENLEAF STACKPOLE, OF ELIZABETH, NEW JERSEY.

Letters Patent No. 113,358, dated April 4, 1871.

IMPROVEMENT IN WHISK BROOMS.

The Schedule referred to in these Letters Patent and making part of the same.

I, GREENLEAF STACKPOLE, of Elizabeth City, in Union county, in the State of New Jersey, have made an Improvement in Whisk Brooms.

*Nature and Objects of my Invention.*

My invention relates to an improvement in whisk-brooms, in which a small brush of bristles, or their equivalent, is attached to the opposite end of the handle of an ordinary whisk broom for the purpose of erasing spots of dirt from clothing before brushing; with a stiff bristle-brush of this kind spots of mud can easily be removed that could not be with the broom.

In the drawing which accompanies this specification and to which reference is made—

Figure 1 is a perspective view of an ordinary whisk-broom with my erasing-brush A attached.

I am aware that a scraper of wood or metal has been made in combination with a whisk broom, but I do not claim that device.

Having thus described my invention,

What I claim as my invention, and desire to secure by Letters Patent, is—

The combination, with a whisk broom, of an erasing-brush of bristles or their equivalent, substantially as and for the purpose set forth.

G. STACKPOLE.

Witnesses:
R. Y. MARTIN,
WM. F. HALL.